Figure 1:
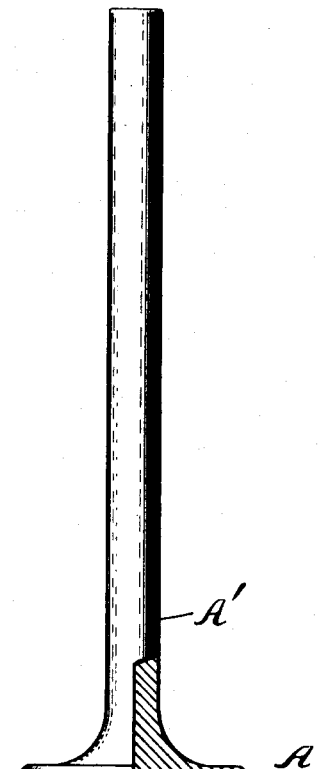

C. E. THOMPSON.
VALVE.
APPLICATION FILED JAN. 6, 1911.

1,106,064.

Patented Aug. 4, 1914.

Witnesses:
Herman Eisele.
Winifred Waltz.

Inventor:
Charles E. Thompson,
By A. C. Merkel,
Attorney.

UNITED STATES PATENT OFFICE.

CHARLES E. THOMPSON, OF CLEVELAND, OHIO.

VALVE.

1,106,064.

Specification of Letters Patent.

Patented Aug. 4, 1914.

Application filed January 6, 1911. Serial No. 601,063.

*To all whom it may concern:*

Be it known that I, CHARLES E. THOMPSON, a citizen of the United States, resident of Cleveland, county of Cuyahoga, and State of Ohio, have invented a new and useful Improvement in Valves, of which the following is a specification, the principle of the invention being herein explained and the best mode in which I have contemplated applying that principle, so as to distinguish it from other inventions.

My invention relates to valves, and particularly to valves used in connection with internal combustion engines in which hydrocarbon is used as a fuel.

The object of the invention is to provide a valve for such use which will be of the required lightness in weight, and at the same time possess the necessary qualities of strength and resistance to the corrosive or chemical action of the hydro-carbon fluids or gases with which they come into contact during use.

It has become well-known in the practice of operating gas engines of the internal combustion type, that cast iron possesses greater durability and has more lasting qualities in resisting corrosion and other chemical action of gasolene and oils, such as are used in the operation of these engines, than any other metal which can be economically used. Inasmuch, however, as these valves are required to have a given amount of strength, it is undesirable to make the cap of the valve of cast iron, for the reason that in order to give it the required strength, the amount of iron used becomes such as to make the valve so heavy that undesirable noisiness results when the engine is operated, and this weight also tends to limit the size of the valve opening which may be adopted in designing the engine. Valves having steel caps are therefore preferably used in many cases, and the seating surfaces thereof, which are the surfaces which come more intimately into contact with the gasolene and oils, are therefore necessarily of steel. Steel being particularly susceptible to corrosion, soon becomes pitted, and leakage of the valve results. In spite of this defect, however, steel valves are continued in use but with corresponding uneconomical effects. Furthermore, I have found that in use the stem of mushroom valves used in internal combustion engines is subjected to certain forces which differ from those to which the cap is subjected. That is, the principal force to which the stem is subjected is a frictional force which results in a wearing or a tendency to wear the surface of such stem. The cap, on the other hand, is not subjected to this frictional action, but is subjected to forces which warp or tend to warp it. It is, as is evident, desirable to maintain the conformation of both the stem and the cap, and particularly the latter, in that any warping thereof results in leakage of the valve.

The desirability of constructing the valve cap in a manner and from a material such that the tendency to warp will be counteracted to the greatest possible extent is particularly desirable as a result of the extended use of valves in motorcycles. Motorcycle valves are operated at extremely high speeds which result in the generation of extremely high temperature, in fact considerably higher than has heretofore been generated in connection with the use of internal combustion engines. These temperatures become so high that sometimes the metal of the valves acquire even a low red heat. Such temperatures in an ordinary valve not constructed in accordance with my invention, it will be readily seen, create conditions which tend to permit the valve to very much more easily warp than would ordinarily be the case.

To overcome these deficiencies, I make the stem of one character of steel, and the cap of another character, as will hereinafter appear.

The specific object of my invention, therefore, is to provide a valve which will have the characteristics of strength belonging to steel, and the power to resist chemical action or corrosion which belongs to cast iron; as well as to provide a structure permanent in its outline and required shape.

My said invention consists of means hereinafter fully described and particularly set forth in the claims.

The annexed drawing and the following description set forth in detail certain means embodying my invention, the disclosed means, however, constituting but one of various mechanical forms in which the principle of the invention may be applied.

Figure 2:
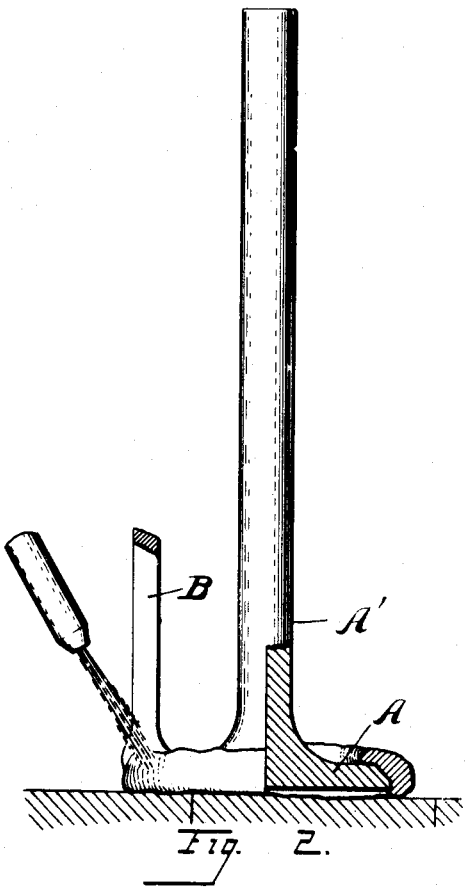
Figure 3:
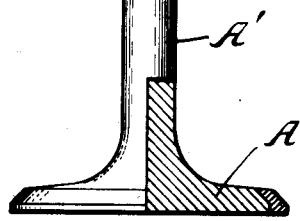

In said annexed drawing:—Figure 1 represents the body portion of a valve together with its stem as prepared prior to the application of the cast iron, said structure being shown partly in cross-section. Fig. 2 is a similar view partly in cross-section showing a mass of cast iron applied thereto. Fig. 3 is a similar view of the completed valve.

In constructing my improved valve, I first form the main or body portion thereof, consisting of the cap portion A and the stem A'. In practice, the stem is made of cold rolled or similar low carbon steel having good wearing qualities and hence capable of resisting the frictional action to the greatest possible extent, and having the necessary tensile strength. To this stem is welded electrically or otherwise the cap portion A which I make of nickel steel or a steel similar thereto having a uniform molecular construction, that is a structure without grain formation, and therefore particularly adapted to resist any warping action, and hence are particularly adapted for use as a cap. By the term steel without grain I mean a steel such as that described having an exceedingly fine, dense, homogeneous, crystalline formation without such granular formation as tends to cleavage. The cap portion made of the above-described character of steel is then machined to assume a diameter less than that of the required completed valve. In order to obtain the required above-described non-granular molecular structure from ordinary nickel steel which contains approximately from .30 to .40 of one per cent. of carbon and 3½ per cent. of nickel and which has a marked granular and non-homogeneous molecular structure, such ordinary nickel steel after the machining operation has been completed is heated to approximately 1500° Fahrenheit and then quenched. I have also found that the percentage of nickel may be varied and the desired result obtained, the best results, however, being obtained by the use of from 1½ to 5 per cent. of nickel, these being the limits which are practically always employed. This structure having been completed, a mass of cast iron is then applied to the periphery, as shown in Fig. 2. This step is carried out by means of an oxi-acetylene flame or other similar source of heat by means of which the end of a bar of cast iron B may be fused while contiguous to the periphery of the body portion A. The application of this flame fuses both the peripheral portion of the steel and the cast iron, and unites the two metals to form an integral mass. This step having been completed, the structure is then machined to assume the desired final exterior contour of the valve, as shown in Fig. 3. By this means, it will be seen that a peripheral rim of cast iron is formed integrally with the body portion of the cap and the seating surface, and therefore that portion of the valve which comes most intimately in contact with the gasolene and oil is formed of cast iron.

As will be observed from the above description, the annular cast iron rim is relatively thin, is provided only for the seating surface and hence, in so far as concerns those characteristics of the valve which give it the tendency to resist warping, is a negligible quantity. In so far as relates to its non-warping qualities, the valve-cap consists substantially wholly of steel of non-granular structure.

In this manner a valve having the required characteristics of strength, durability and resistance to corrosion and chemical action is provided.

Having fully described my invention, what I claim and desire to secure by Letters Patent is:—

1. As a new article of manufacture, a valve having a stem of steel having a character such as will permit it to resist frictional action to a high degree; a cap having its main or body-portion integrally united with said stem and made of steel adapted to resist warping to a high degree; and a cast iron rim or seat-portion integrally united with the said body-portion.

2. As a new article of manufacture, a valve having a stem of cold-rolled steel; a cap having its main or body-portion integrally united with said stem and made from steel of a non-granular molecular structure; and a cast iron rim or seat-portion integrally united with the said body-portion.

3. As a new article of manufacture, a valve having a stem of cold-rolled steel; a cap having its main or body-portion made of steel adapted to resist warping to a high degree; and a cast iron rim or seat-portion integrally united with the said body-portion.

4. As a new article of manufacture, a valve having a stem of steel having a character such as will resist frictional action to a high degree; a cap integrally united to said stem and made from steel having a non-granular molecular structure; and a cast iron rim integrally united with the said body-portion.

5. As a new article of manufacture, a valve having a stem of low carbon steel, and a cap having its main or body portion formed of nickel steel and its rim of cast iron.

6. As a new article of manufacture, a valve having a stem of low carbon steel, and a cap having its main or body portion formed of nickel steel and its rim of cast iron integrally connected therewith.

7. A composite valve for gas engines and the like consisting of an integral head and stem of steel, and a relatively thin annulus of cast iron on the contact surface of said head.

Signed by me, this 23d day of December, 1910.

C. E. THOMPSON.

Attested by—
 WINIFRED WALTZ,
 HERMAN EISELE.